(12) United States Patent
Woodruff et al.

(10) Patent No.: US 10,093,349 B2
(45) Date of Patent: Oct. 9, 2018

(54) MONITORING OF AN ELECTRIC MOTOR IN AN ELECTRIC POWER STEERING ASSEMBLY

(71) Applicant: TRW Automotive U.S. LLC, Livonia, MI (US)

(72) Inventors: Christopher Woodruff, Sterling Heights, MI (US); Timothy Sworn, Harborne (GB)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/058,267

(22) Filed: Mar. 2, 2016

(65) Prior Publication Data

US 2017/0253267 A1    Sep. 7, 2017

(51) Int. Cl.
| | |
|---|---|
| *B62D 5/04* | (2006.01) |
| *B62D 3/06* | (2006.01) |
| *G01D 5/14* | (2006.01) |
| *G01D 5/16* | (2006.01) |

(52) U.S. Cl.
CPC ............ *B62D 5/0481* (2013.01); *B62D 3/06* (2013.01); *B62D 5/0424* (2013.01); *B62D 5/0448* (2013.01); *G01D 5/142* (2013.01); *G01D 5/16* (2013.01)

(58) Field of Classification Search
CPC .............. G01D 5/12–5/2525; G01P 3/42–3/60
See application file for complete search history.

(56) References Cited

U.S. PATENT DOCUMENTS

| | | | |
|---|---|---|---|
| 6,163,148 A * | 12/2000 | Takada | B62M 6/45 180/206.3 |
| 7,598,733 B2 | 10/2009 | Mehnert et al. | |
| 8,283,914 B2 | 10/2012 | Mehnert et al. | |
| 2005/0068133 A1* | 3/2005 | Romanik | H01H 36/0033 335/207 |
| 2005/0258950 A1* | 11/2005 | Sahashi | B60C 23/041 340/444 |
| 2008/0303513 A1* | 12/2008 | Turner | G01P 3/488 324/160 |
| 2011/0006757 A1* | 1/2011 | Mehnert | G01D 5/145 324/207.2 |
| 2011/0018528 A1* | 1/2011 | Semineth | G01D 5/2451 324/207.25 |
| 2011/0148397 A1* | 6/2011 | Siraky | G01D 5/147 324/206 |

(Continued)

FOREIGN PATENT DOCUMENTS

| | | |
|---|---|---|
| EP | 2221587 A2 | 8/2010 |
| WO | 2004046735 A1 | 6/2004 |

*Primary Examiner* — Huy Q Phan
*Assistant Examiner* — David Frederiksen
(74) *Attorney, Agent, or Firm* — MacMillan, Sobanski & Todd, LLC

(57) ABSTRACT

A magnet is fixed to an output shaft of a motor. The output shaft is rotated such that a magnetic field emitted by the magnet also rotates. A voltage pulse is generated from a passive sensor when the magnetic field rotates past the passive sensor. The voltage pulse is generated using a Wiegand wire. An active sensor is activated, from an unpowered state, in response to the voltage pulse. The active sensor detects a position of the magnet that correlates to a position of the output shaft.

17 Claims, 6 Drawing Sheets

(56) References Cited

U.S. PATENT DOCUMENTS

| | | | | |
|---|---|---|---|---|
| 2011/0184691 A1* | 7/2011 | Mehnert | ........ | G01D 5/145 |
| | | | | 702/151 |
| 2013/0134967 A1* | 5/2013 | Kaufmann | ........ | H02P 6/185 |
| | | | | 324/207.25 |
| 2013/0200883 A1* | 8/2013 | Mehnert | ........ | G01D 5/145 |
| | | | | 324/207.2 |
| 2014/0156220 A1* | 6/2014 | Okamoto | ........ | G01R 33/072 |
| | | | | 702/150 |
| 2014/0291062 A1* | 10/2014 | Tojo | ........ | B62D 5/0424 |
| | | | | 180/443 |
| 2015/0130450 A1* | 5/2015 | Gehringer | ........ | G01D 5/145 |
| | | | | 324/207.25 |
| 2015/0354986 A1* | 12/2015 | Mehnert | ........ | G01D 5/145 |
| | | | | 324/207.16 |

* cited by examiner

| Polarity of stored Pulse/Polarity of Last Pulse | Polarity of Trigger Pulse/Polarity of Current Pulse | Polarity of Single Sample Reading/Polarity of Current Output | Direction of Rotation |
|---|---|---|---|
| Negative | Positive | Negative | Counterclockwise |
| Negative | Positive | Positive | Clockwise |
| Positive | Negative | Positive | Counterclockwise |
| Positive | Negative | Negative | Clockwise |
| Negative | Negative | N/A | Error |
| Positive | Positive | N/A | Error |

Fig. 8B

MONITORING OF AN ELECTRIC MOTOR IN AN ELECTRIC POWER STEERING ASSEMBLY

BACKGROUND OF INVENTION

This invention relates in general to vehicle electric power steering assemblies and in particular to monitoring an electric motor in such a vehicle electric power steering assembly.

An electric power steering (EPS) assembly for turning steerable wheels of a vehicle includes a ball nut for transmitting force between an axially movable rack member and an electric motor. Upon actuation of the motor, the ball nut is driven to rotate relative to the rack member and the rotational force of the ball nut is transmitted to the rack member by balls that drive the rack member axially. The axial movement of the rack member by the balls effects turning movement of the steerable wheels.

The EPS assembly uses an active sensor to detect a position of the electric motor. For example, the active sensor may be a Hall effect sensor or a giant magnetoresistance (GMR) sensor. The active sensor may be set to detect the position of the motor at regular intervals—i.e., the active sensor may be strobed to monitor the motor non-continuously—to reduce an otherwise continuous electrical power draw of the active sensor. However, even when strobed, the active sensor still monitors the position of the electric motor when the motor is not turning. The active sensor monitoring the position of the electric motor when the motor is not turning results in unnecessary electrical power consumption. Thus, it would be desirable to activate the active sensor when the motor is turning to monitor a position of the motor.

SUMMARY OF INVENTION

This invention relates to monitoring an electric motor in a vehicle electric power steering assembly.

According to one embodiment, a method of monitoring a motor in an electric power steering motor may comprise, individually and/or in combination, one or more of the following features: A magnet is fixed to an output shaft of the motor. The output shaft is rotated such that a magnetic field emitted by the magnet also rotates. A voltage pulse is generated from a passive sensor when the magnetic field rotates past the passive sensor. The voltage pulse is generated using a Wiegand wire. An active sensor is activated, from an unpowered state, in response to the voltage pulse. The active sensor detects a position of the magnet that correlates to a position of the output shaft.

According to another embodiment, a vehicle electric power steering assembly may comprise, individually and/or in combination, one or more of the following features: a motor, a magnet, a passive sensor, and an active sensor. The magnet is fixed to an output shaft of the motor and emits a magnetic field. The magnetic field rotates when the motor rotates. The passive sensor has a Wiegand wire that generates a voltage pulse in response to rotation of the magnetic field. The active sensor is activated, from an unpowered state, by the voltage pulse and detects a position of the magnet. The position of the magnet correlates to a position of the output shaft According to another embodiment, a vehicle power steering assembly may comprise, individually and/or in combination, one or more of the following features: a motor, a magnet, a passive sensor, and an active sensor. The magnet is fixed to an output shaft of the motor and emits a magnetic field. The magnet rotates with the output shaft. Poles of the magnet are perpendicular to a rotational drive axis of the output shaft. The passive sensor has a Wiegand wire and generates a voltage pulse in response to rotation of the magnetic field. The active sensor is activated, from an unpowered state, in response to the voltage pulse when the voltage pulse exceeds a minimum voltage pulse. The active sensor detects a position of the magnet and the position of the magnet correlates to a position of the output shaft. A power supply powers the active sensor when the active sensor is activated. The power supply is not the passive sensor. Stored and last voltage pulses from the passive sensor are stored in a memory unit. A count of rotations of the output shaft is determined as a function of the last voltage pulse, a current voltage pulse generated by the passive sensor, and a current output of the active sensor. A controller determines a direction of rotation for the output shaft as a function of a hysteresis threshold position and position pulses generated by the active sensor.

An advantage of an embodiment is reduction of electrical power consumption by the active sensor. Other advantages of this invention will become apparent to those skilled in the art from the following detailed description of the preferred embodiments, when read in light of the accompanying drawings.

BRIEF DESCRIPTION OF DRAWINGS

FIG. 8B is a table of values for the monitoring cycle of the detector assembly of FIG. 1.

DETAILED DESCRIPTION OF THE PREFERRED EMBODIMENT

Figure 1:
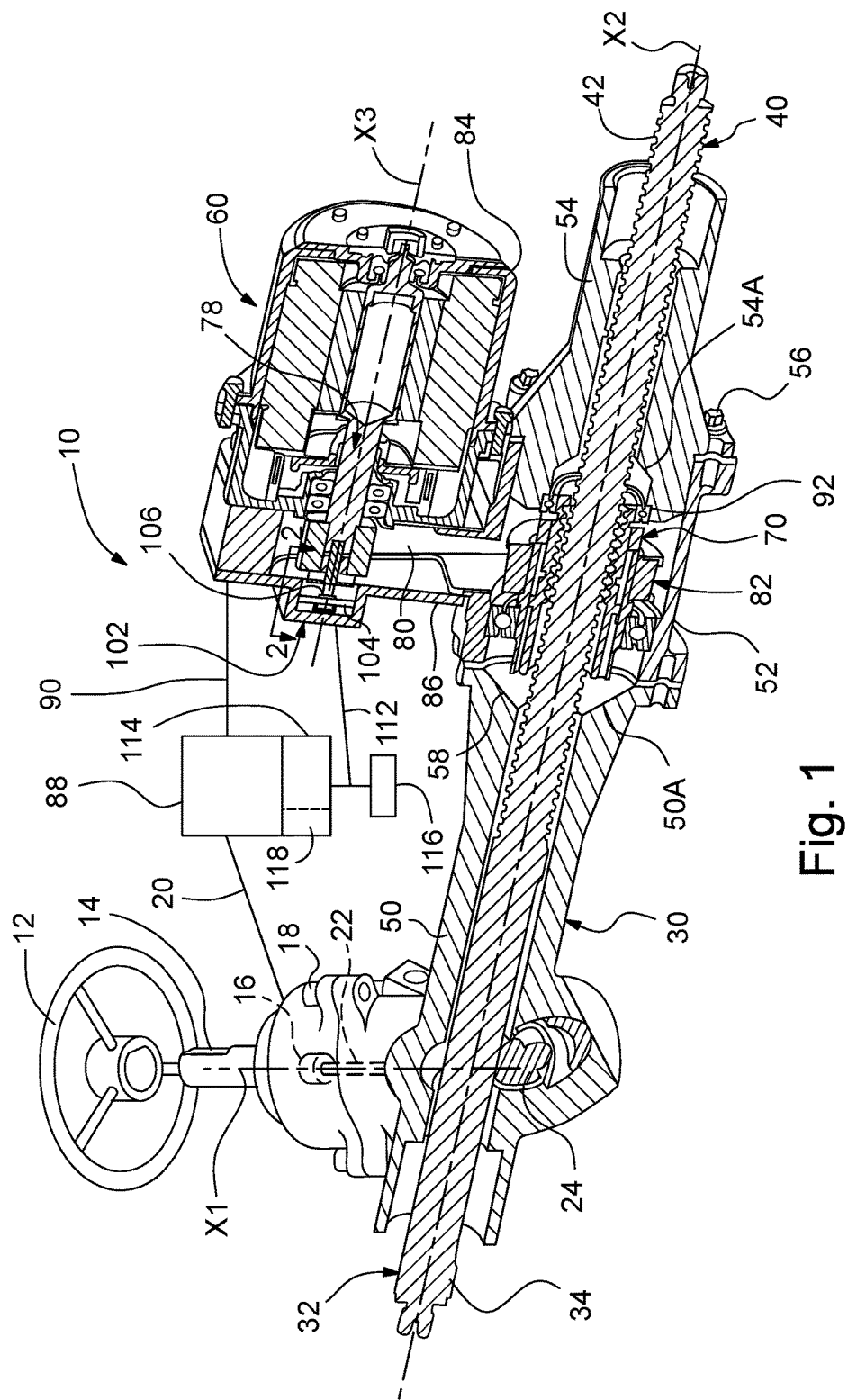
FIG. 1 is a partial sectional view of a vehicle electrical power steering assembly having a first embodiment of a motor position detector assembly according to the present invention.
Figure 2:
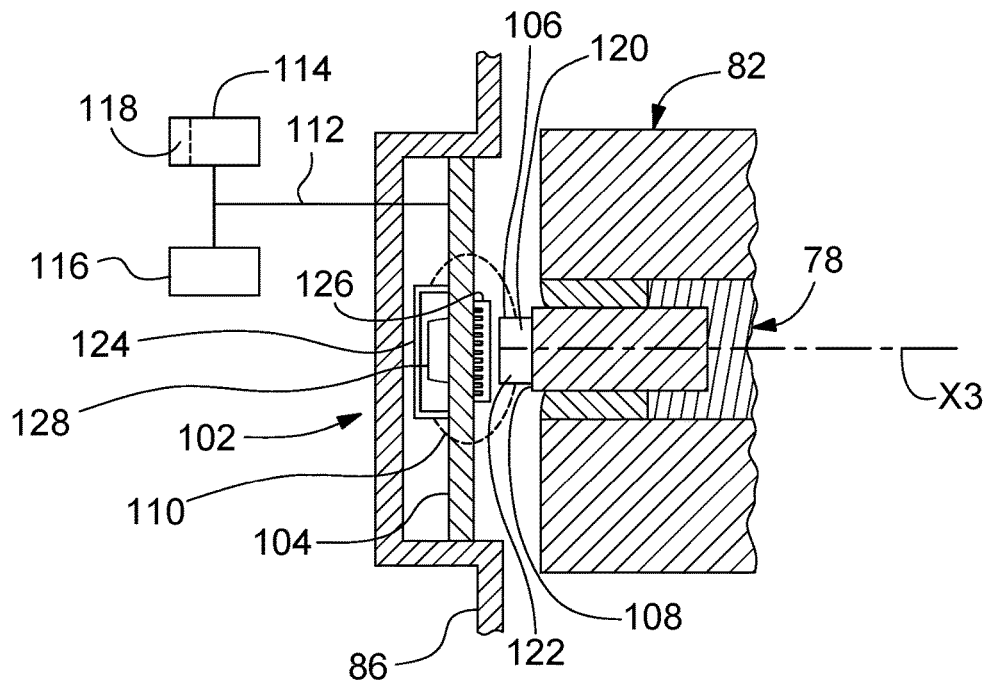
FIG. 2 is a sectional view taken along line 2-2 of FIG. 1.

Referring now to FIGS. 1 and 2, there is illustrated an embodiment of a motor position detector assembly, indicated generally at 102, produced in accordance with the present invention. It should be noted that while this invention will be described and illustrated in conjunction with a particular electric power steering (EPS) assembly, indicated generally at 10 and disclosed herein, it will be appreciated that the detector assembly 102 may be used in conjunction with other types or kinds of EPS assemblies. As illustrated, the EPS assembly 10 is a vehicle electric belt driven rack drive steering assembly and is associated with the front driven wheels (not shown) of the vehicle. The general structure and operation of the EPS assembly 10 is conventional in the art. Thus, only those portions of the EPS assembly 10 which are necessary for a full understanding of this invention will be explained and illustrated in detail.

The illustrated EPS assembly 10 includes a vehicle steering wheel 12 and a rotatable input shaft 14. The input shaft 14 is operatively coupled, in a manner not shown, to the steering wheel 12 for rotation therewith about a steering axis X1. A torque sensor 16 is located inside a pinion housing 18 and encircles the input shaft 14. The torque sensor 16 includes coils (not shown) which respond to rotation of the input shaft 14 and which generate an electrical signal over first electrical lines 20 indicative of the direction and magnitude of applied steering torque.

A torsion bar 22 is provided to connect the input shaft 14 to a pinion 24 located inside the pinion housing 18. The torsion bar 22 twists in response to the steering torque applied to the steering wheel 12. When the torsion bar 22 twists, relative rotation occurs between the input shaft 14 and the pinion 24.

The pinion housing 18 is attached to a rack housing, indicated generally at 30. A linearly movable steering member, indicated generally at 32, extends axially through the rack housing 30. The steering member 32 is linearly (or axially) movable along a rack axis X2. A rack portion 34 of the steering member 32 is provided with a series of rack teeth (not shown) which meshingly engage gear teeth (not shown) provided on the pinion 24. The steering member 32 further includes a screw portion 40 having an external screw thread convolution 42. The steering member 32 is connected with steerable wheels (not shown) of the vehicle through tie rods (not shown) located at the distal ends of the steering member 32. Linear movement of the steering member 32 along the rack axis X2 results in steering movement of the steerable wheels in a known manner.

The rack housing 30 has a generally cylindrical configuration and includes a first section 50, a second section 52 and a third section 54. The first section 50 is connected to the second section 52 by suitable means, such as for example by a plurality of bolts and nuts (not shown). Similarly, the second section 52 is connected to the third section 54 by suitable means, such as for example by a plurality of bolts and nuts (only the bolts are shown in FIG. 1 by reference number 56). The first section 50 is provided with a radially enlarged end 50A, and the third section 54 is provided with a radially enlarged end 54A. The enlarged ends 50A and 54A of the respective first and third sections 50 and 54, respectively, cooperate with the second section 52 to define an annular chamber 58. Alternatively, as known to those skilled in the art, the structure of the rack housing 30 can be other than illustrated. For example, the rack housing 30 can include less than three sections or more than three sections if so desired.

The power steering assembly 10 further includes an electric motor 60 which is drivably connected to a ball nut assembly, indicated generally at 70. The ball nut assembly 70 includes a ball nut, the ball nut being typical as known to those skilled in the art. As such, the ball nut assembly 70 effects axial movement of the steering member 32 upon rotation of the steering wheel 12. In the event of the inability of the motor 60 to effect axial movement of the steering member 32, the mechanical connection between the gear teeth on the pinion 24 and the rack teeth on the rack portion 34 of the steering member 32 permits manual steering of the vehicle. The ball nut assembly 70 is located in the chamber 58 of the rack housing 30 and encircles the screw portion 40 of the steering member 32.

The motor 60 is supported relative to the rack housing 30 by suitable means. The motor 60 includes an output shaft, indicated generally at 78, which is connected to a member 80 for rotation therewith. For example, the member 80 may be a timing belt. The timing belt 80 is operatively connected to a pulley assembly 82. Thus, when the motor 60 is actuated, the timing belt 80 is rotated via the output shaft 78 so as to rotate the pulley assembly 82. The rotation of the pulley assembly 82 causes the ball nut assembly 70 to be rotated and thereby produce axial movement of the steering member 32.

The motor 60 is housed in a first housing 84 and the output shaft 78 and timing belt 80 are housed in a second housing 86. As illustrated, the first and second housings 84 and 86, respectively, are separate housing pieces. Alternatively, the motor 60, output shaft 78, and timing belt 80 may be housed in a single, common housing.

The steering assembly 10 further includes an electronic control unit or controller 88. The controller 88 is preferably secured to the rack housing 30 in a manner not shown. The controller 88 is electrically connected to the motor 60 by second electrical lines 90 and is electrically connected by the first electrical lines 20 to the torque sensor 16. The controller 88 is operable to receive electrical signals from the torque sensor 16 and to control the motor 60 in accordance with the received electrical signals. When steering torque is applied to the vehicle steering wheel 12, the input shaft 14 rotates about the axis X1. The direction and magnitude of the applied steering torque are sensed by the torque sensor 16. The torque sensor 16 outputs an electrical signal to the controller 88. The motor 60 is activated by a control signal transmitted to the motor 60 by the controller 88, and the output shaft 78 of the motor 60 is caused to rotate about a rotational drive axis X3.

The rotating motor shaft 78 rotates the pulley assembly 82 via the belt 80 which in turn transmits the drive force of the motor 60 to the ball nut of the ball nut assembly 70. The rotation of the ball nut results in linear movement of the steering member 32. Balls 92 transmit the rotation force of the ball nut to the rack portion 34 of the steering member 32. Because the ball nut is fixed in position axially, the steering member 32 is driven to move axially in response to rotation of the ball nut to effect steering movement of the steerable wheels of the vehicle. The motor 60 thus provides steering assist in response to the applied steering torque.

The detector assembly 102 has a printed circuit board 104 and a dipole magnet 106. The circuit board 104 is fixed to the second housing 86 and the magnet 106 is fixed to an end 108 of the output shaft 78. The circuit board 104 is positioned to be within a magnetic field 110 emitted by the magnet 106. The detector assembly 102 is connected by a power and data bus 112 to a motor position detector controller 114 and a power supply 116. The power and data bus 112 may include the first and second electrical lines 20 and 90, respectively.

The detector controller 114 includes a memory unit 118 for a purpose that will be discussed. Alternatively, the memory unit 118 may be a separate component from the detector controller 114 and interface with the detector controller 114 via the bus 112. The memory unit 118 may be a ferroelectric random access memory (FRAM). As illustrated, the detector controller 114 is separate from the controller 88. Alternatively, the detector controller 114 may be incorporated into the controller 88. The detector controller 114 and the controller 88 may be a single application specific integrated circuit.

The magnet 106 has a positive pole 120 and a negative pole 122. The magnet 106 is mounted to the end 108 such that the magnet 106 rotates with the output shaft 78 about the rotational axis X3. The magnet 106 emits the magnetic field 110 between the positive and negative poles 120 and 122, respectively, such that the magnetic field 110 is generally perpendicular to the rotational axis X3. The magnetic field 110 also rotates as the output shaft 78 rotates. As a non-limiting example, the magnet 106 may be a cylindrical dipole of the $RE_2Co_{17}$ (200/140) type and measuring 8 mm by 2.5 mm. Alternatively, another suitable magnet may be used. A passive sensor 124 and an active sensor 126 are mounted on the circuit board 104. As illustrated, the passive and active sensors 124 and 126, respectively, are mounted on opposite sides of the circuit board 104. Alternatively, the passive and active sensors 124 and 126, respectively, may be mounted on a common side of the circuit board 104.

The passive sensor 124 includes a Wiegand wire 128. The Wiegand wire 128 is a ferromagnetic wire which has a hard outer shell and a soft inner core. The Wiegand wire 128 exhibits a Wiegand effect by generating a predictable voltage pulse in a coil in response to an alternating magnetic field—i.e., the voltage pulses are generated in the coil when the magnetic field reverses. Construction of the Wiegand wire 128 and the Wiegand effect are well known to those skilled in the art. In the rotating magnetic field 110, once the magnetic field 110 is over a threshold strength, the coil generates voltage pulses that are of alternating polarity, but identical magnitude, regardless of how much the magnetic field 110 exceeds the threshold magnetic strength.

The passive sensor 124 may be a sense coil wrapped around the Wiegand wire 128. When the Wiegand effect is initiated by rotating the magnetic field 110, the Wiegand wire 128 generates a second, rapidly changing magnetic field (not illustrated) that the coil converts into the voltage pulses. Typically, the voltage pulses are approximately 10-20 μs in duration and between 5-10 V in magnitude.

The active sensor 126 detects a position of the rotating magnet 106, and by extension the output shaft 78 and motor 60. As discussed herein, the position of the magnet 106 is also a position of the output shaft 78 and motor 60, a direction of rotation of the magnet 106 is also a direction of rotation of the output shaft 78 and motor 60, and a count of rotations for the magnet 106 is also a count of rotations for the output shaft 78 and motor 60. Similarly, other parameters of the magnet 106 that are a function of the position of the magnet 106 extend to the output shaft 78 and motor 60. For example, the active sensor 126 may be a Hall effect sensor or a giant magnetoresistive (GMR) sensor. Alternatively, an optical sensor could be used as the active sensor 126 when a relationship between the optical sensor and the magnetic field 110 generated by the magnet 106 is known. The active sensor 126 is maintained in an unpowered state until activated by the detector controller 114. The active sensor 126 is again returned to the unpowered state when the magnet 106 stops rotating. For example, the active sensor 126 may be unpowered once the magnet 106 has remained stationary for a period of time.

The voltage pulses may degrade as a distance between the Wiegand wire 128 and the magnet 106 increases or decreases. For example, degradation in the voltage pulses may occur when the Wiegand wire 128 is more than 7 mm or less than 2 mm from the magnet 106. The degradation results in a significant decrease in magnitude of the voltage pulses.

Figure 3A:
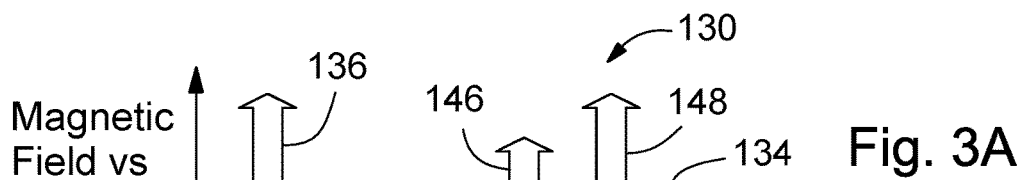
FIGS. 3A-3B are graphs of symmetric polarity switching of the detector assembly of FIG. 1.
Figure 3B:
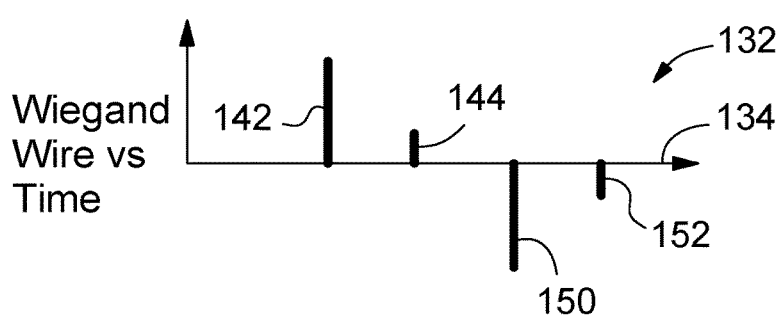

Referring now to FIGS. 3A and 3B, there is illustrated symmetric polarity switching of the Wiegand wire 128. A first plot, indicated generally at 130, illustrates the magnetic field 110 emitted by the rotating magnet 106, and a second plot, indicated generally at 132, illustrates polarity of the voltage pulses generated in the sense coil—i.e., the passive sensor 124—as the magnetic field 110 rotates in FIG. 3A. The first and second plots 130 and 132, respectively, are against time 134.

The magnetic field 110 has an initial value 136 when the magnet 106 is stationary. The magnet 106 then begins to rotate such that the magnetic field 110 reverses and increases in magnitude from a first value 138 to a second value 140. The change in the magnetic field 110 from the first value 138 to the second value 140 generates the first and second pulses 142 and 144, respectively. The magnetic field 110 then reverses again and increases in magnitude from a third value 146 to a fourth value 148. The change in the magnetic field 110 from the third value 146 to the fourth value 148 generates the third and fourth pulses 150 and 152, respectively. As is readily apparent from FIG. 3B, the first and second pulses 142 and 144, respectively, are symmetric to the third and fourth pulses 150 and 152, respectively.

The Wiegand wire 128 causes a smaller magnitude pulse to be generated in the sense coil when the magnetic field 110 increases after a magnetic polarity switch. For example, the second pulse 144 is smaller in magnitude than the first pulse 142 as the magnetic field 110 increases from the first value 138 to the second value 140. Similarly, the fourth pulse 152 is smaller in magnitude than the third pulse 150 as the magnetic field increases from the third value 146 to the fourth value 148. This is because of the outer shell switching polarity.

Referring now to FIGS. 4A-4E, there is illustrated a sequence of positions of the magnet 106 relative to the Wiegand wire 128. As illustrated, the magnet 106 is at an angle α of between 30° and 45° from the Wiegand wire 128. The voltage pulses generated in the sense coil by the Wiegand wire 128 have greatest magnitude when the magnet 106 is at the angle α. This is illustrated in FIGS. 3A and 3B by the greater magnitude first and third voltage pulses 142 and 150, respectively, being generated when the magnetic field 110 is at first and third values 138 and 146, respectively, which are less than maximum strength of the magnetic field 110.

Figure 4A:
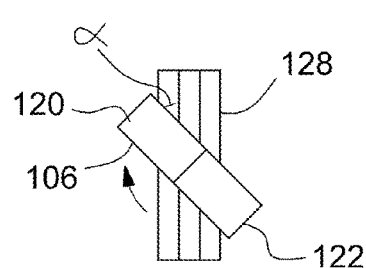
FIGS. 4A-4E are magnet positions for the detector assembly of FIG. 1.
Figure 4B:
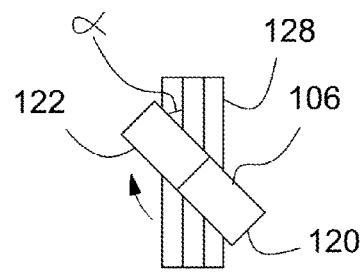
Figures 4C, 4D, 4E:
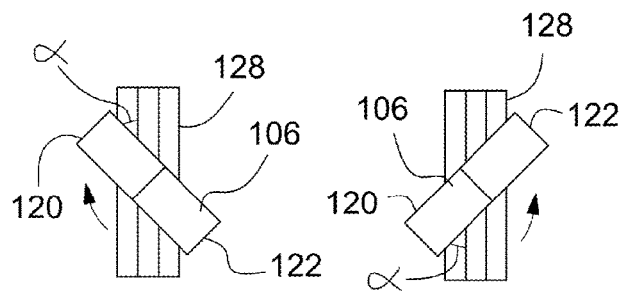

In FIGS. 4A-4C the magnet 106 is rotating continuously clockwise, in FIG. 4D the magnet 106 has reversed direction and is rotating counterclockwise, and in FIG. 4E the magnet 106 is again rotating clockwise. The magnet 106 reverses rotation from counterclockwise in FIG. 4D to clockwise in FIG. 4E, and the magnetic field 110 also reverses, just before reaching a hysteresis threshold. While the hysteresis threshold is a function of the specific magnet 106 and Wiegand wire 128 utilized, it may be expected that the hysteresis threshold is encountered as the magnet 106 and Wiegand wire 128 are approximately parallel.

In FIGS. 4A-4D, the Wiegand wire 128 experiences symmetric switching (as illustrated in FIGS. 3A and 3B) that generates, in the sense coil, voltage pulses having positive polarity in FIGS. 4A and 4C and negative polarity in FIGS. 4B and 4D. In FIG. 4E, the Wiegand wire 128 experiences an asymmetric polarity switch because the magnetic field 110 reverses before the hysteresis threshold and peak magnetization of the magnet 106—e.g., at the first value 138 or the third value 146 and not at the second value 140 or the fourth value 148. As such, a magnitude of an asymmetric voltage pulse generated in FIG. 4E is a function of the total counterclockwise rotation in FIG. 4D. As the magnet 106 approaches parallel alignment with the Wiegand wire 128 and the hysteresis threshold, the greater the magnitude of the asymmetric pulse generated in the sense coil in FIG. 4E. This is because as the magnet 106 rotates closer to parallel with the Wiegand wire 128, more of the outer shell is magnetized before the magnet 106 changes rotational direction. Once the magnet 106 crosses the hysteresis threshold, the asymmetric pulse will become a symmetric pulse.

Figure 5A:
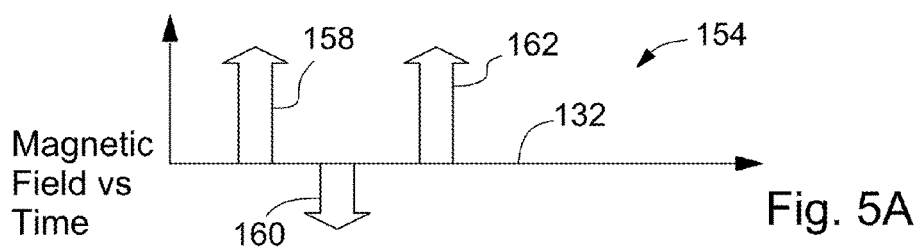
FIGS. 5A-5B are graphs of asymmetric polarity switching of the detector assembly of FIG. 1.
Figure 5B:
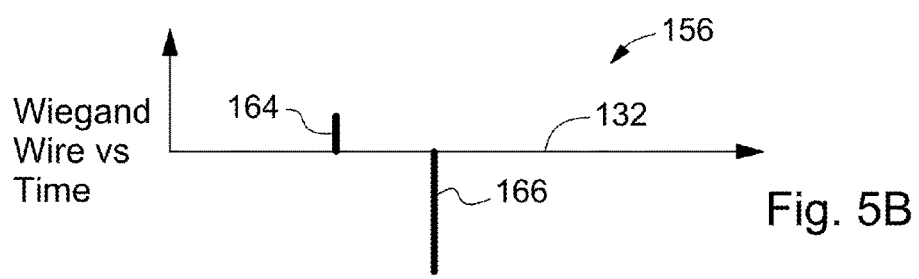

Referring now to FIGS. 5A and 5B, there is illustrated the asymmetric polarity switch of the Wiegand wire 128 that occurs, for example, when the magnet 106 is rotated from FIG. 4D to FIG. 4E. A third plot, indicated generally at 154, illustrates the magnetic field 110 emitted by the rotating magnet 106, and a corresponding fourth plot, indicated generally at 156, illustrates polarity of the voltage pulses generated in the sense coil as the magnetic field 110 rotates in FIG. 5A. The third and fourth plots 154 and 156, respectively, are against time 132.

The magnet 106 is rotating in a first direction (for example, counterclockwise as shown in FIG. 4D) and the magnetic field 110 has an initial value 158. The magnet 106 continues rotating in the first direction and the magnetic field 110 has a first value 160 of opposite polarity to the initial value 158. The magnet 106 then reverses rotation to a second direction (for example, clockwise as shown in FIG. 4E) just before the hysteresis threshold. The magnet 106 continues rotating in the second direction and has a second value 162, similar to the fourth value 148 in FIG. 3A. The sense coil generates a first pulse 164 corresponding to the first value 160 and a second pulse 166 corresponding to the second value 162. The first pulse 164 is the asymmetric pulse and has a much smaller magnitude than the pulses generated by symmetric switching. As discussed, the magnitude of the asymmetric pulse increases the closer the magnet 106 is to parallel with the Wiegand wire 128 when the magnet 106 reverses rotation.

Figure 6:
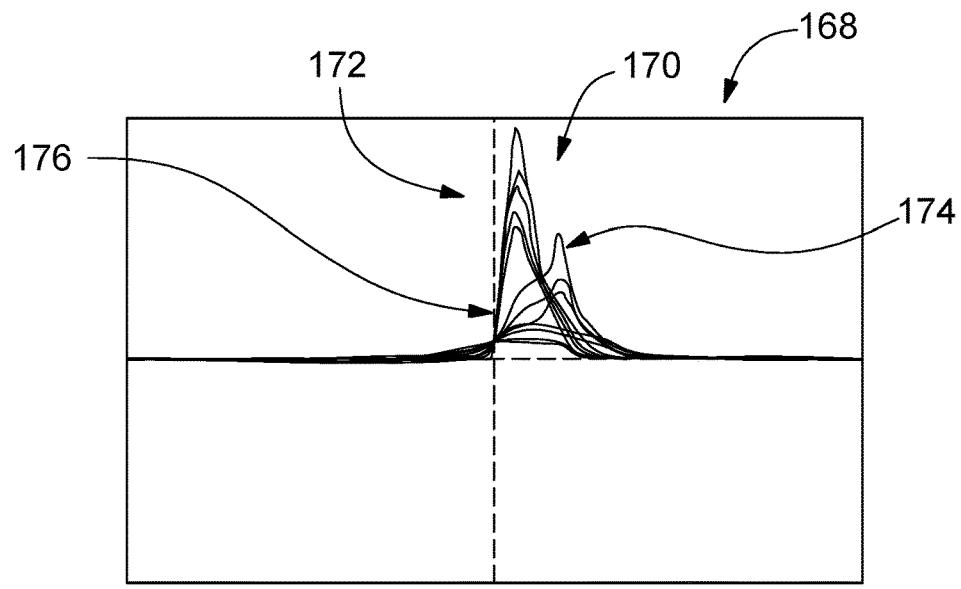
FIG. 6 is a graph of voltage pulses generated by the detector assembly of FIG. 1.

Referring now to FIG. 6, there is illustrated a graph, indicated generally at 168, showing a plurality of voltage pulses, indicated generally at 170, generated in the sense coil as the magnetic field 110 rotates. Symmetric pulses are illustrated as leftward peaks in FIG. 6, indicated generally at 172, and asymmetric pulses are illustrated as rightward peaks, indicated generally at 174. As discussed, magnitudes of the asymmetric pulses 174 increase as the magnet 106 approaches closer to being parallel to the Wiegand wire 128 before reversing rotation. A change in rise slope, indicated generally at 176, is observable for the asymmetric pulses 174. The passive sensor 124 should be appropriately shielded to prevent interference from external magnetic fields or noise.

Figure 7:
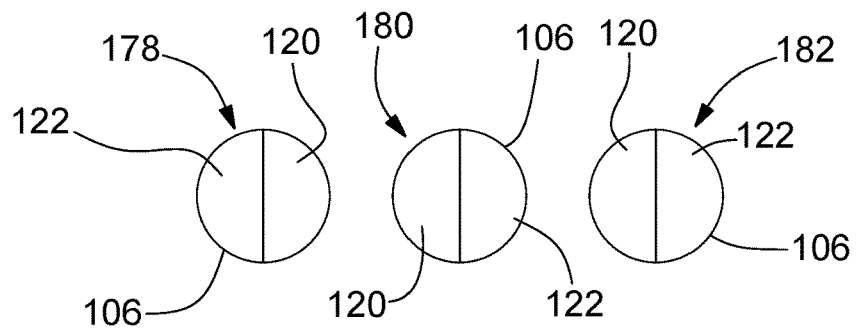
FIG. 7 is magnet positions for a monitoring cycle of the position detector assembly of FIG. 1.

Referring now to FIGS. 7-8B, there is illustrated a monitoring cycle for the detector assembly 102. The detector assembly 102 performs a monitoring cycle for detecting the position of the magnet 106, the direction of rotation of the magnet 106, or a count of rotations of the magnet 106. The position of the magnet 106, the direction of rotation of the magnet 106, and the count of rotations of the magnet 106 may be computed by the detector controller 114. The monitoring cycle commences when the magnet 106 starts rotating from a stopped state. Rotation of the magnetic field 110 causes the passive sensor 124 to generate the voltage pulses. A first pulse of the voltage pulses is a trigger pulse. The trigger pulse is transmitted to the detector controller 114.

Upon receiving the trigger pulse, the detector controller 114 activates the unpowered active sensor 126. After being activated, the active sensor 126 is powered from the power supply 116 (the power supply 116 being separate and distinct from the passive sensor 124 and the Wiegand wire 128).

Also upon receiving the trigger pulse, the detector controller 114 stores a polarity of the trigger pulse in the memory unit 118. A polarity of a stored trigger pulse has previously been stored in the memory unit 118. The stored trigger pulse is from a last monitoring cycle before the stopped state.

To avoid interference from noise, the detector controller 114 activates the active sensor 126 when the trigger pulse exceeds a minimum magnitude voltage pulse. The minimum magnitude voltage pulse is a function of characteristics of the magnet 106 and the passive sensor 124. For example, the minimum magnitude voltage pulse may be the voltage pulse generated when the rotating magnetic field 110 reverses polarity. Then, because the magnet 106 rotates 180° between polarity reversals, there is at most 180° between a last detected position of the magnet 106 and a current position of the magnet 106 when the trigger pulse is generated. The last detected position is where the magnet 106 was last detected by the active sensor 126 before the active sensor 126 was unpowered. The last detected position is stored in the memory unit 118. Alternatively, a plurality of minimum magnitude voltage pulses may be set to initiate a plurality of power-up modes for the active sensor 126. The different power-up modes are a function of maximum allowable current consumption. The trigger pulse may be either symmetric or asymmetric.

Once the active sensor 126 is activated and powered, the active sensor 126 makes and outputs a single sampled reading to determine the current position of the magnet 106. The detector controller 114 stores the single reading in the memory unit 118. Alternatively, the active sensor 126 may be activated for continuous sampling.

When the motor 60 subsequently stops, as discussed, the magnet 106 also stops and the active sensor 126 is unpowered. When the magnet 106 starts rotating again, the detector assembly 102 repeats the monitoring cycle and again detects the position of the magnet 106.

When the detector assembly 102 is operating normally, the Wiegand wire 128 will not cause two consecutive trigger pulses to be generated with like polarities. For example, a first trigger pulse has positive polarity. A second trigger pulse is generated in the coil when the magnetic field 110 reverses. The second trigger pulse has negative polarity, opposite the first trigger pulse, because the magnetic field 110 reversed to generate the second trigger pulse. The next trigger pulse to have like polarity to the first trigger pulse is not generated in the coil until the magnetic field 110 again reverses polarity and a third trigger pulse is generated as a result.

FIG. 7 illustrates rotation of the magnet 106. The last detected position of the magnet 106 is indicated generally at 178. The last detected position 178 has an absolute position of 90°. Polarity of the stored trigger pulse for the last detected position 178 is positive. The magnet 106 subsequently rotates either clockwise 180° to a first current state, indicated generally at 180, or counterclockwise 180° to a second current state, indicated generally at 182. In either the first or second current state 180 or 182, respectively, the absolute position of the magnet 106 is 270°. By the magnet 106 rotating 180°, the magnetic field 110 reverses and the trigger pulse is generated. The trigger pulse has a negative polarity, opposite the stored trigger pulse because the magnetic field 110 reversed. The active sensor 126 is used to detect which way the magnet 106 rotates.

Figure 8A:
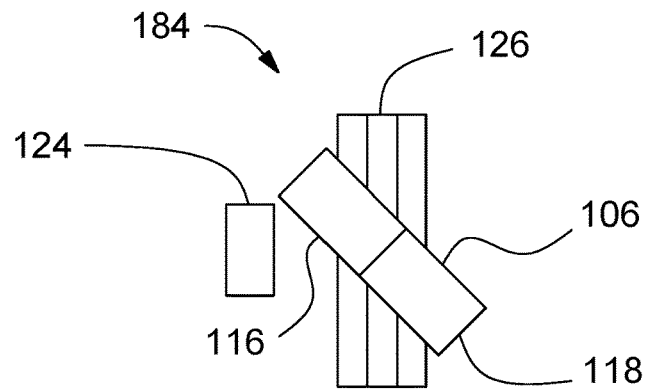
FIG. 8A is an initial position for the monitoring cycle of the detector assembly of FIG. 1.

FIG. 8A illustrates initial positions, indicated generally at 184, of the magnet 106 and active sensor 126 for which a truth table, indicated generally at 186 in FIG. 8B, holds true.

The magnet 106 is at an angle of 45°. In the initial position 184, the trigger pulse generated by the passive sensor 124 has positive polarity.

The direction of rotation may be detected using the hysteresis threshold. Asymmetric switching is indicative that the hysteresis threshold has been reached, but not crossed—i.e., that the magnet 106 has approached parallel with the Wiegand wire 128, but reversed direction before crossing. The asymmetric switch is produced because of a lack of full rotation of the magnet 106 that crosses over to the full opposite strength of the magnetic field 110. This occurs, for example, when the direction of rotation is reversed prior to reaching the full opposite strength of the magnetic field 110. The point at which the asymmetric switch occurs—i.e., the hysteresis threshold—is determined by magnetic properties of the Wiegand wire 128 and magnetic strength of the magnet 106. As discussed, the hysteresis threshold typically occurs just before the magnet 106 is parallel with the Wiegand wire 128. Detecting the direction of rotation using the hysteresis threshold does not consider polarity of the pulses.

The active sensor 126 generates position pulses when detecting the position of the magnet 106. The position pulses indicate the position of the magnet 106. For example, the position pulses may be expressed in degrees and indicate a position between 0° and 360°. The hysteresis threshold may also be expressed in degrees as a hysteresis threshold position between 0° and 360° at which the hysteresis threshold is encountered. A difference between sequential first and second position pulses may be compared to the hysteresis threshold position to determine the direction of rotation.

When the position pulse difference is greater than the hysteresis position threshold, then the magnet 106 is continuing to rotate in the same direction. When the position pulse difference is less than the hysteresis position threshold, then the magnet 106 has reversed direction. As a non-limiting example, if the magnet 106 continues rotating in the same direction, then the active sensor 126 generates the position pulses every 180°. However, if the magnet 106 reverses direction, then the active sensor 126 will generate a new position pulse within 90° of a previous position pulse. This indicates that the direction of rotation for the magnet 106 has changed. The hysteresis behavior is dependent on properties of the magnet 106, Wiegand wire 128, and sensor coil.

Alternatively, the direction of rotation may be detected using the truth table 186 and polarity of the pulses. When polarity of the stored trigger pulse is negative, polarity of the trigger pulse is positive, and polarity of the single reading is negative, then the magnet 106 is rotating counterclockwise. When polarity of the stored trigger pulse is negative, polarity of the trigger pulse is positive, and polarity of the single reading is positive, then the magnet 106 is rotating clockwise. When polarity of the stored trigger pulse is positive, polarity of the trigger pulse is negative, and polarity of the single reading is positive, then the magnet 106 is rotating counterclockwise. When polarity of the stored trigger pulse is positive, polarity of the trigger pulse is negative, and polarity of the single reading is negative, then the magnet 106 is rotating clockwise. When the polarities of the trigger pulse and the stored trigger pulse are the same, regardless of polarity of the single reading, then an error has occurred. The controller 88 or detector controller 114 may initiate a diagnostic routine for the power steering assembly 10 in response to the error.

The count of rotations may also be determined using the truth table 186. As the magnet 106 continues to rotate, the passive sensor 124 will continue to generate the voltage pulses. The detector controller 114 may tally the voltage pulses to maintain the count of rotations. However, asymmetric switching may affect the count of rotations. To detect the count of rotations, polarities of a current voltage pulse and a last voltage pulse are considered with a current output of the active sensor 126. The last pulse is the voltage pulse immediately prior to the current pulse. The last and current pulses are typically subsequent to the trigger pulse and the current output is typically subsequent to the single sample reading.

Asymmetric switching may be controlled for by setting the minimum magnitude voltage pulse to a value between magnitudes of symmetric and asymmetric pulses. This allows a rotational accuracy of ±180°, which corresponds to peak magnetization of the magnet 106 that generates the current pulse. However, as discussed, the voltage pulses generated by asymmetric switching may be close in magnitude to the voltage pulses generated by symmetric switching. The asymmetric pulses may even exceed the symmetric pulses. To achieve greater accuracy and avoid unnecessary activation of the active sensor 126 because of the asymmetric pulses, the current output is also considered in addition to polarities of the current and last pulses. The count of rotations is increased only when the current pulse is present and an active sensor output changes polarity.

When the magnet 106 is rotating, polarity of the current pulse and last pulse are opposite, but the active sensor output has not changed polarity, then the magnet 106 has reversed direction and rotated approximately 90°, not a full 180° that would change polarity of the active sensor. The magnet 106 may reverse direction and the coil generates the asymmetric pulse. Error proofing is accomplished by detecting the asymmetric pulse. When the active sensor 124 is activated, the net movement will have been, ignoring mechanical hysteresis, 90° in a first direction and 90° in a second direction that is opposite the first direction. Otherwise, if the asymmetric pulse is ignored, it will appear that two consecutive, like polarity pulses were generated and the diagnostic routine will be unnecessarily initiated.

Polarity of the pulses generated by the passive sensor 124 may be used to achieve a high integrity function of the detector assembly 102—e.g., direction of rotation and/or count of rotations.

Figure 9:
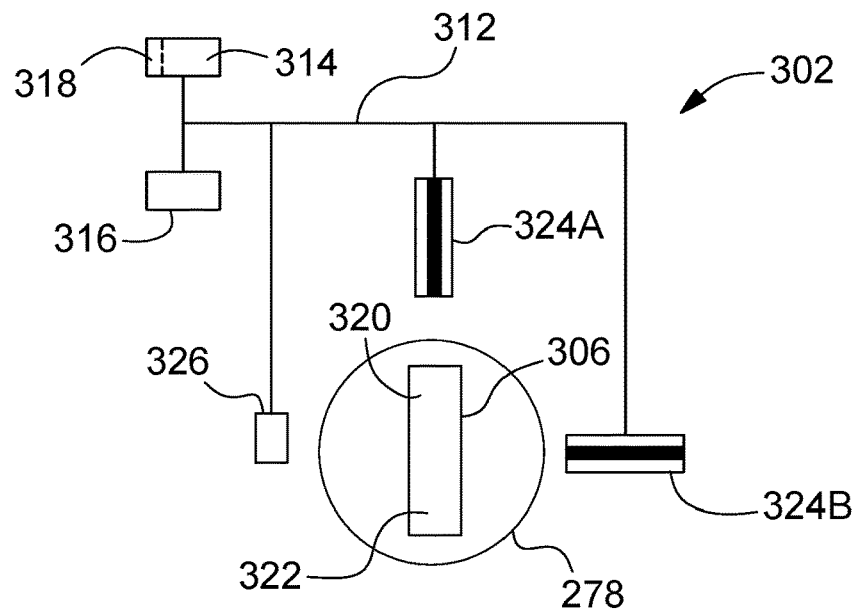
FIG. 9 is a second embodiment of a motor position detector assembly according to the present invention.

Referring now to FIG. 9, there is illustrated a second embodiment of a motor position detector assembly, indicated generally at 302. Because the detector assembly 302 is a variation of the detector assembly 102 of FIGS. 2-8B, like reference numerals, increased by 200, designate corresponding parts in the drawings and detailed description thereof will be omitted. First and second passive sensors 324A and 324B, respectively, are arranged at 90° around an output shaft 278. Each of the first and second passive sensors 324A and 324B, respectively, independently generates a trigger pulse to activate an active sensor 326.

The first passive sensor 324A may be used to validate performance of the second passive sensor 324B, and vice versa. For example, the first passive sensor 324A may cross check the count of rotations made by the second passive sensor 324B, and vice versa, to increase integrity of the detector assembly 302. Or, the second passive sensor 324B may provide redundancy for the first passive sensor 324A, and vice versa, to increase availability of the detector assembly 302 and reduce chances of a missed rotation of the output shaft 278 that would alter the count of rotations. Alternatively, cross checking and/or redundancy may be provided with multiple active sensors.

Figure 10:
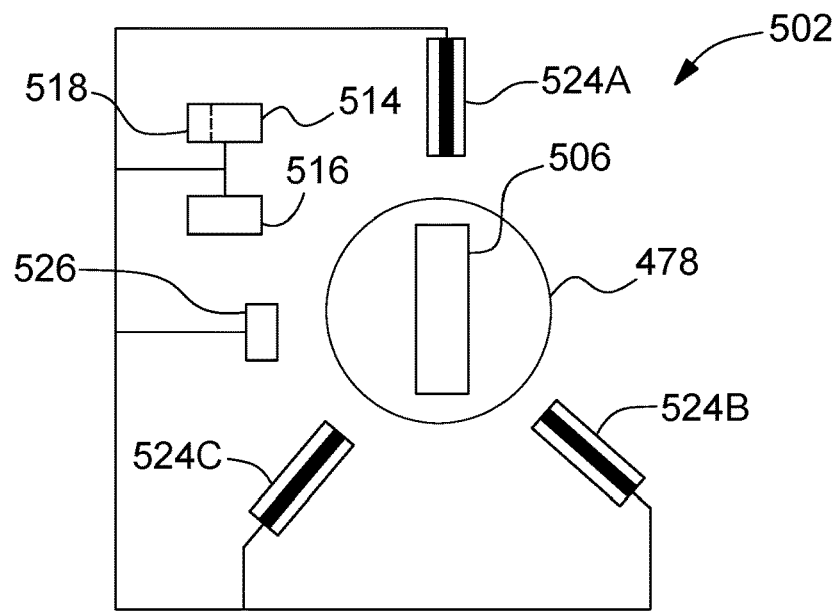
FIG. 10 is a third embodiment of a motor position detector assembly according to the present invention.

Referring now to FIG. 10, there is illustrated a third embodiment of a motor position detector assembly, indicated generally at 502. Because the detector assembly 502 is a variation of the detector assembly 102 of FIGS. 2-8B, like reference numerals, increased by 400, designate corresponding parts in the drawings and detailed description thereof will be omitted. First, second, and third passive sensors 524A, 524B, and 524C, respectively, are arranged at 120° around an output shaft 478. Each of the first, second, and third passive sensors 524A, 524B, and 524C, respectively, independently generates a trigger pulse to activate an active sensor 526.

Multiple passive sensors provide redundancy and reduce a chance of a missed rotation of the output shaft 478. Each of the first, second, or third passive sensors 524A, 524B, or 524C may be used to validate performance of the other two passive sensors. For example, the first passive sensor 524A may cross check the count of rotations made by the second or third passive sensors 524B or 524C, respectively to increase integrity of the detector assembly 502. Or, the first passive sensor 524A may provide redundancy for the second or third passive sensors 524B or 524C, respectively, to increase availability of the detector assembly 502 and reduce chances of a missed rotation of the output shaft 578 that would alter the count of rotations. Alternatively, cross checking and/or redundancy may be provided with multiple active sensors.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method of monitoring an electric motor of a vehicle electric power steering assembly comprising the steps of:
   fixing a magnet to an output shaft of the motor;
   rotating the output shaft such that a magnetic field emitted by the magnet also rotates;
   generating a voltage pulse from a passive sensor when the magnetic field rotates past the passive sensor, wherein the voltage pulse is generated using a Wiegand wire;
   activating an active sensor, from an unpowered state, in response to the voltage pulse, wherein the active sensor detects a position of the magnet that correlates to a position of the output shaft;
   powering the active sensor with a power supply to active the active sensor, wherein the power supply is other than the passive sensor; and
   determining a direction of rotation for the output shaft as a function of a hysteresis threshold position and position pulses generated by the active sensor;
   wherein a difference between first and second position pulses being greater than the hysteresis threshold position indicates the output shaft is continuing to rotate in a first direction and the difference being less than the hysteresis threshold position indicates the output shaft is rotating in a second direction opposite the first direction.

2. The method of claim 1 wherein the active sensor is a Hall effect sensor or a giant magnetoresistive sensor.

3. The method of claim 1 further comprising the step of:
   determining a direction of rotation for the output shaft as a function of the voltage pulse, a stored voltage pulse generated by the passive sensor and stored in a memory unit, and a single sample reading of the active sensor.

4. The method of claim 1 further comprising the step of:
   counting rotations for the output shaft as a function of a current voltage pulse, a last voltage pulse generated by the passive sensor and stored in a memory unit, and a current output of the active sensor.

5. The method of claim 1 further comprising the step of:
   disregarding the voltage pulse when the voltage pulse is below a minimum voltage pulse, wherein a disregarded voltage pulse does not activate the active sensor.

6. The method of claim 1 further comprising the step of:
   generating an additional voltage pulse from an additional passive sensor when the magnetic field rotates past the additional passive sensor and the additional voltage pulse is generated using a second Wiegand wire.

7. The method of claim 6 wherein the additional passive sensor provides cross checking or redundancy for the passive sensor.

8. The method of claim 1 further comprising the step of:
   unpowering the active sensor from the power supply when the output shaft stops rotating.

9. A vehicle electric power steering assembly comprising:
   a motor having an output shaft;
   a magnet fixed to the output shaft and emitting a magnetic field, wherein the magnetic field rotates when the motor rotates;
   a passive sensor having a Wiegand wire and generating a voltage pulse in response to rotation of the magnetic field;
   an active sensor detecting a position of the magnet, wherein the active sensor is activated, from an unpowered state, by the voltage pulse and the position of the magnet correlates to a position of the output shaft; and
   a power supply powering the active sensor when the active sensor is activated, wherein the power supply is other than the passive sensor;
   wherein a direction of rotation for the output shaft is determined as a function of a hysteresis threshold position and position pulses generated by the active sensor; and
   wherein a difference between first and second position pulses being greater than the hysteresis threshold position indicates the output shaft is continuing to rotate in a first direction and the difference being less than the hysteresis threshold indicates the output shaft is rotating in a second direction opposite the first direction.

10. The assembly of claim 9 further comprising:
    a controller receiving the voltage pulse and activating the active sensor.

11. The assembly of claim 9 further comprising:
    at least one additional passive sensor having an additional Wiegand wire generating an additional voltage pulse in response to rotation of the magnetic field, wherein the active sensor is activated, from the unpowered state, by either the voltage pulse or the additional voltage pulse and the additional passive sensor provides cross checking or redundancy for the passive sensor.

12. The assembly of claim 9 further comprising:
    a controller, wherein a direction of the rotation is determined by the controller as a function of a hysteresis threshold position and position pulses generated by the active sensor.

13. The assembly of claim 9 further comprising:
    a memory unit for storing a stored voltage pulse from the passive sensor, wherein a direction of rotation of the output shaft is determined as a function of the voltage pulse, the stored voltage pulse, and a single sample reading of the active sensor.

14. The assembly of claim 9 wherein:
a memory unit for storing a last voltage pulse generated by the passive sensor, wherein a count of rotations of the output shaft is determined as a function of the last voltage pulse, a current voltage pulse generated by the passive sensor, and a current output of the active sensor.

15. The assembly of claim 9 further comprising:
a steering member disposed in a rack housing, wherein the steering member has a rack portion operatively connected to a vehicle steering wheel and a screw portion;
a ball nut assembly operatively connected to the screw portion for effecting axial movement of the steering member upon rotation of the vehicle steering wheel; and
a pulley assembly operatively connecting the motor to the ball nut assembly.

16. A vehicle electric power steering assembly comprising:
a motor having an output shaft;
a magnet fixed to and rotating with the output shaft, wherein the magnet emits a magnetic field and poles of the magnet are perpendicular to a rotational drive axis of the output shaft;
a passive sensor having a Wiegand wire and generating a voltage pulse in response to rotation of the magnetic field;
an active sensor detecting a position of the magnet, wherein the active sensor is activated, from an unpowered state, in response to the voltage pulse, when the voltage pulse exceeds a minimum voltage pulse, and the position of the magnet correlates to a position of the output shaft;
a power supply powering the active sensor when the active sensor is activated, wherein the power supply is not the passive sensor; and
a memory unit, wherein a last voltage pulse from the passive sensor is stored in the memory unit and a count of rotations of the output shaft is determined as a function of the last voltage pulse, a current voltage pulse generated by the passive sensor, and a current output of the active sensor; and
a controller, wherein the controller determines a direction of rotation for the output shaft as a function of a hysteresis threshold position and position pulses generated by the active sensor;
wherein a direction of rotation for the output shaft is determined as a function of a hysteresis threshold position and position pulses generated by the active sensor; and
wherein a difference between first and second position pulses being greater than the hysteresis threshold position indicates the output shaft is continuing to rotate in a first direction and the difference being less than the hysteresis threshold indicates the output shaft is rotating in a second direction opposite the first direction.

17. The assembly of claim 16 further comprising:
at least one additional passive sensor having an additional Wiegand wire generating an additional voltage pulse in response to rotation of the magnetic field, wherein the active sensor is activated, from the unpowered state, by either the voltage pulse or the additional voltage pulse and the additional passive sensor provides cross checking or redundancy for the passive sensor.

\* \* \* \* \*